(12) United States Patent
Pesetsky

(10) Patent No.: US 9,033,661 B2
(45) Date of Patent: May 19, 2015

(54) ROTOR BLADE ASSEMBLY FOR WIND TURBINE

(75) Inventor: David Samuel Pesetsky, Greenville, SC (US)

(73) Assignee: General Electric Company, Schenectady, NY (US)

( * ) Notice: Subject to any disclaimer, the term of this patent is extended or adjusted under 35 U.S.C. 154(b) by 690 days.

(21) Appl. No.: 13/396,817

(22) Filed: Feb. 15, 2012

(65) Prior Publication Data
US 2013/0209255 A1 Aug. 15, 2013

(51) Int. Cl.
F03D 1/06 (2006.01)

(52) U.S. Cl.
CPC ......... *F03D 1/0633* (2013.01); *F05B 2240/122* (2013.01); *F05B 2240/301* (2013.01); *F05B 2240/31* (2013.01); *Y02E 10/721* (2013.01)

(58) Field of Classification Search
CPC ... F03D 1/0633; F03D 1/0641; F03D 1/0675; F03D 7/0232; F03D 7/0252; F03D 11/0025
USPC ............. 416/41, 42, 44, 23, DIG. 5, 240, 131
See application file for complete search history.

(56) References Cited

U.S. PATENT DOCUMENTS

| 2,493,895 | A | * | 1/1950 | Osterback | 416/132 R |
| 2,625,997 | A | * | 1/1953 | Doak | 416/23 |
| 4,692,095 | A | * | 9/1987 | Lawson-Tancred | 416/23 |
| 5,106,265 | A | * | 4/1992 | Holzem | 416/23 |
| 7,632,068 | B2 | * | 12/2009 | Bak et al. | 416/23 |
| 2003/0091436 | A1 | * | 5/2003 | Stiesdal | 416/1 |
| 2009/0284016 | A1 | | 11/2009 | Van Dam et al. | |
| 2009/0285682 | A1 | | 11/2009 | Baker et al. | |
| 2012/0141271 | A1 | * | 6/2012 | Southwick | 416/23 |

FOREIGN PATENT DOCUMENTS

GB 2473448 A * 3/2011
WO WO 2009137143 A1 * 11/2009

* cited by examiner

*Primary Examiner* — Dwayne J White
*Assistant Examiner* — Adam W Brown
(74) *Attorney, Agent, or Firm* — Dority & Manning, P.A.

(57) ABSTRACT

A rotor blade assembly is disclosed. The rotor blade assembly includes a rotor blade having exterior surfaces defining a pressure side, a suction side, a leading edge, and a trailing edge extending between a tip and a root. The rotor blade further defines a span and a chord. The rotor blade includes a skin layer that includes the exterior surfaces. The rotor blade assembly further includes a passive spoiler assembly operable to alter a flow past an exterior surface of the rotor blade. The spoiler assembly includes a spoiler feature movable between a non-deployed position and a deployed position. Movement of the spoiler feature from the non-deployed position to the deployed position is caused by a change in an applied force to the spoiler feature by the skin layer.

20 Claims, 6 Drawing Sheets

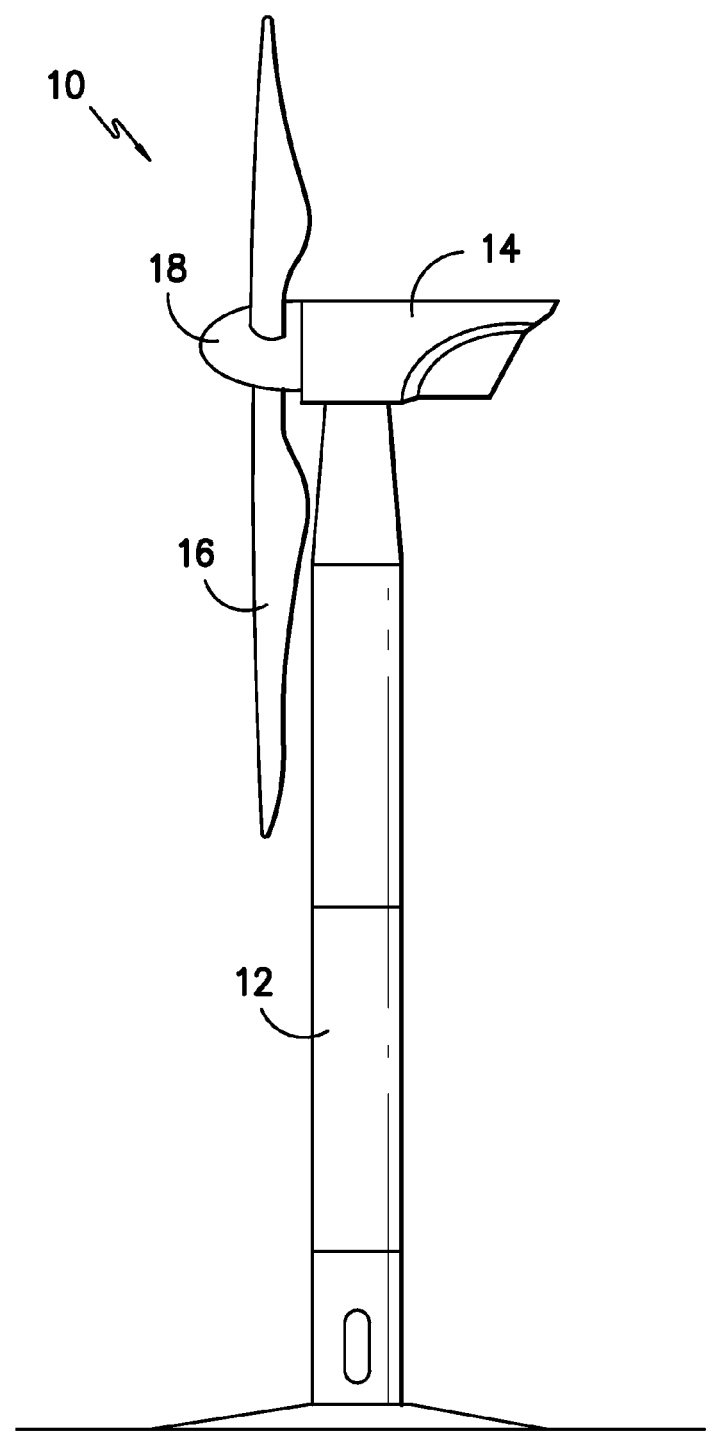
FIG. -1-
PRIOR ART

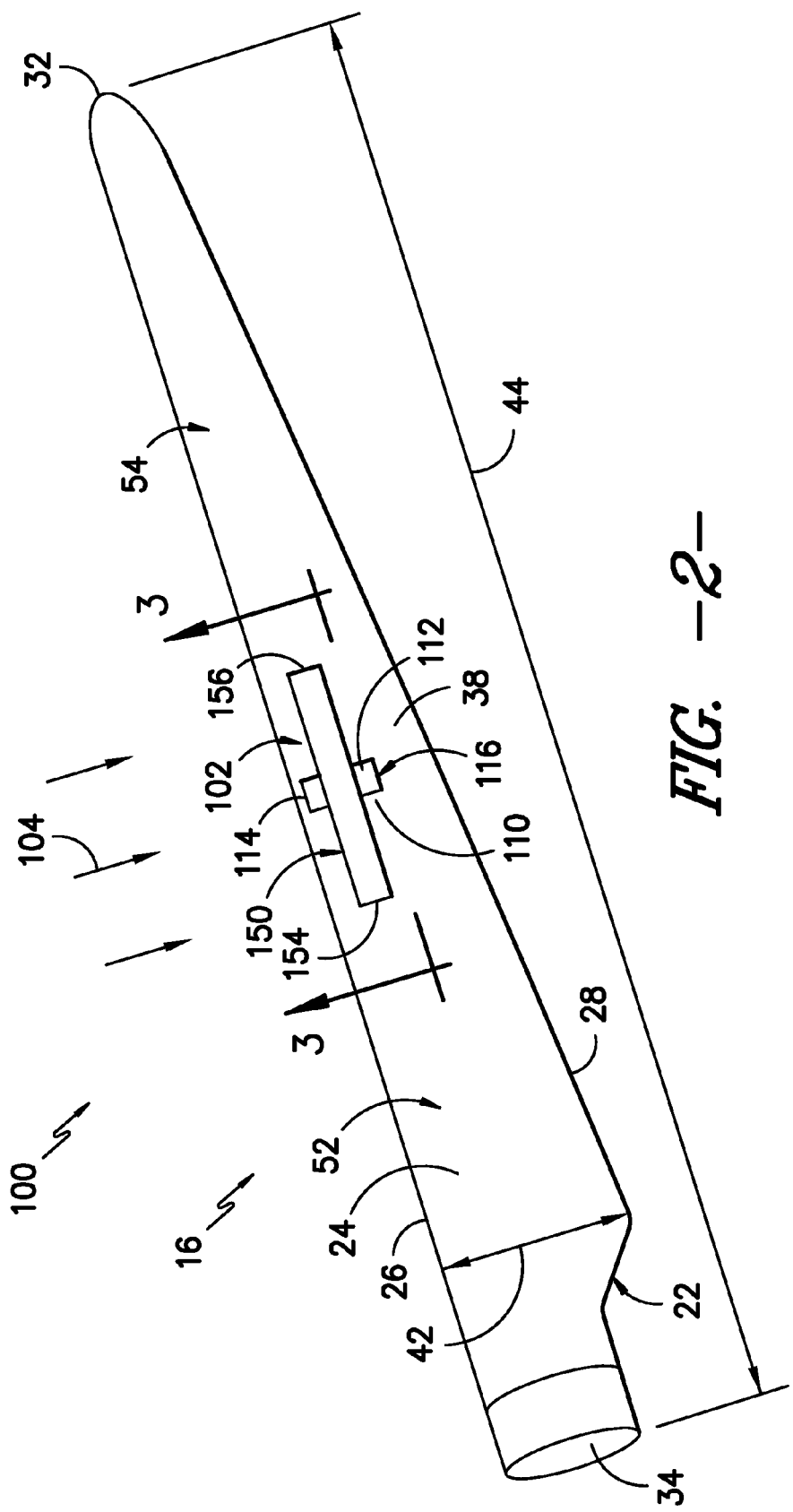
FIG. -2-

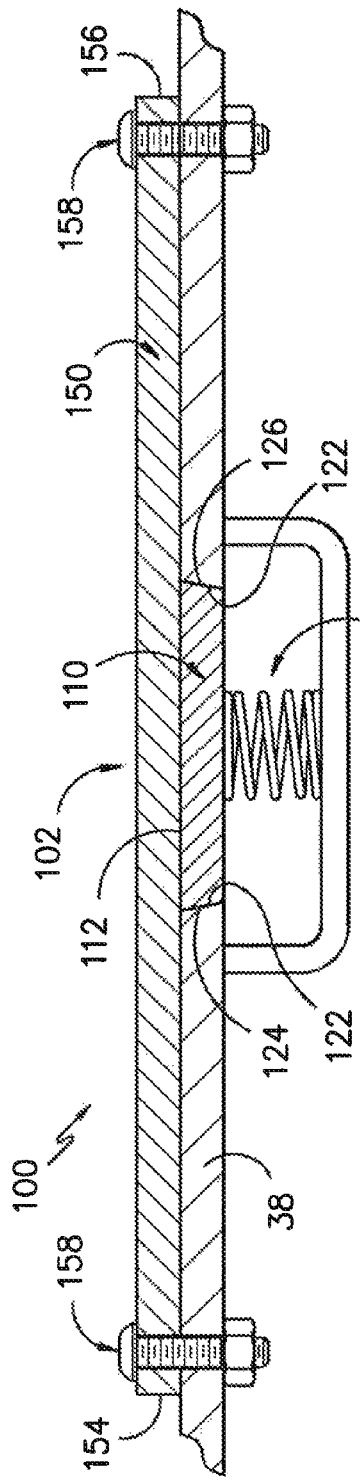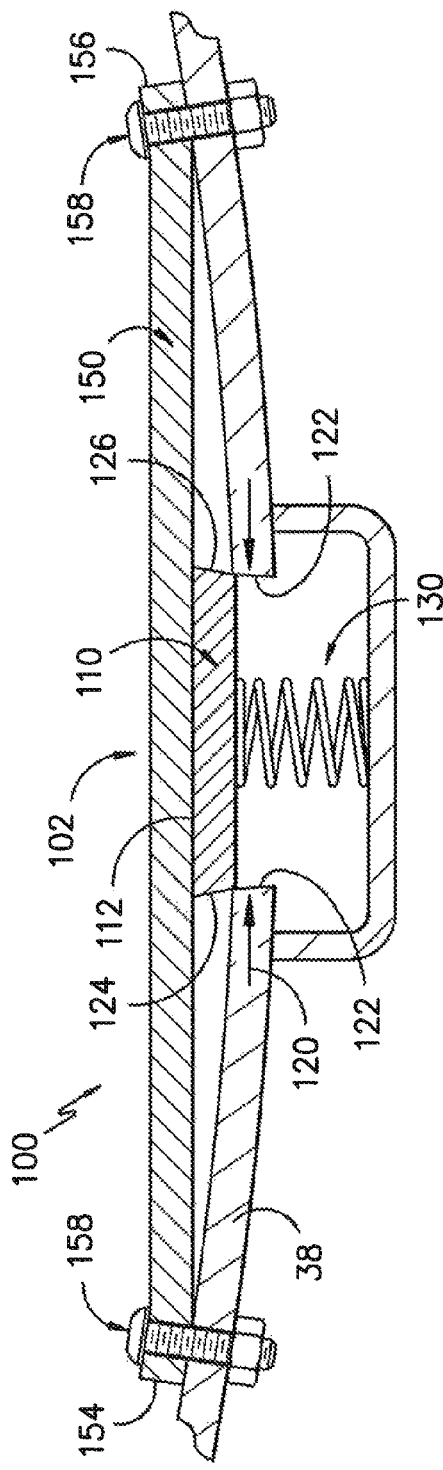

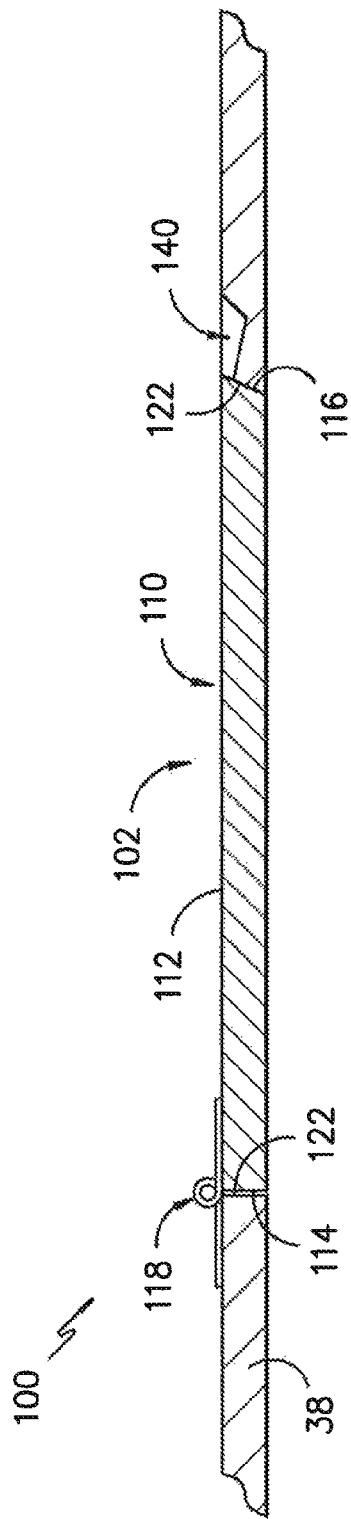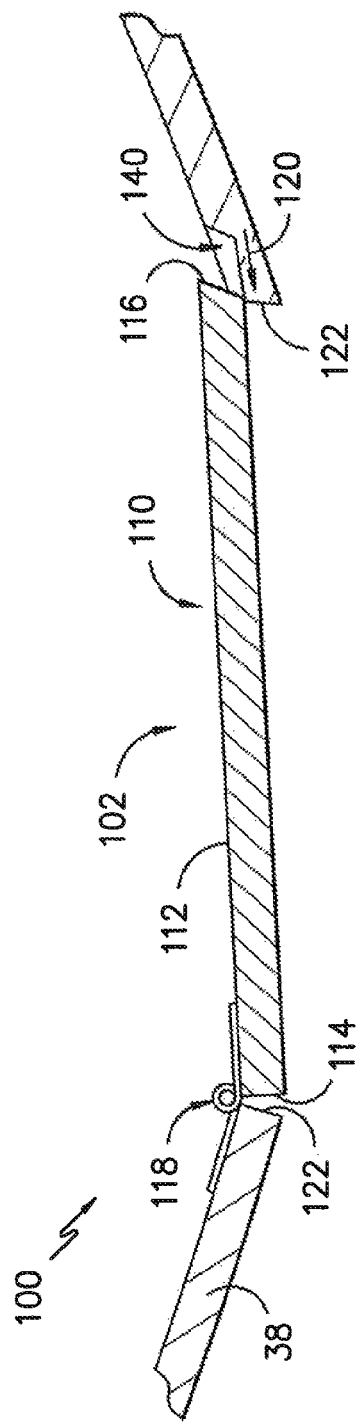

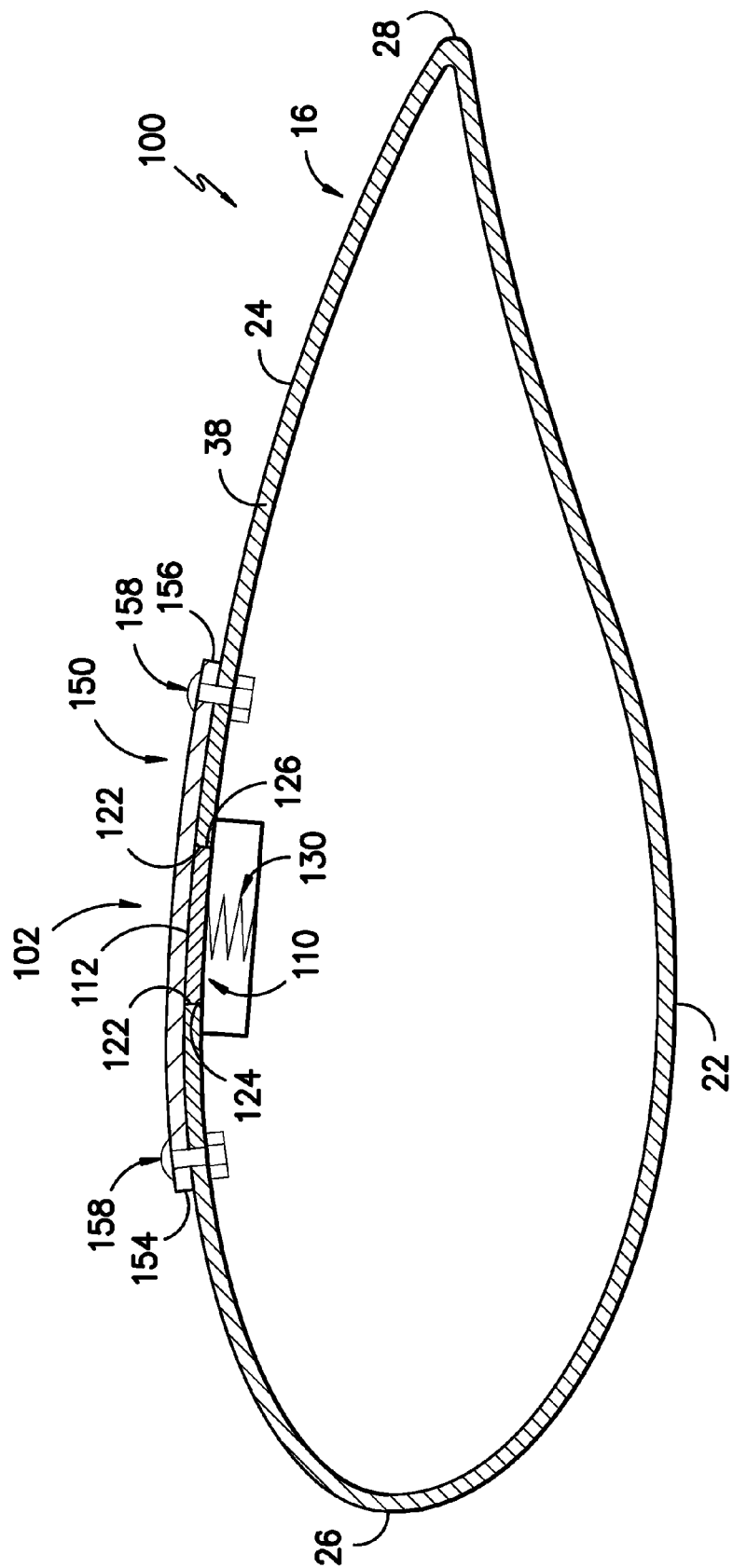
FIG. -7-

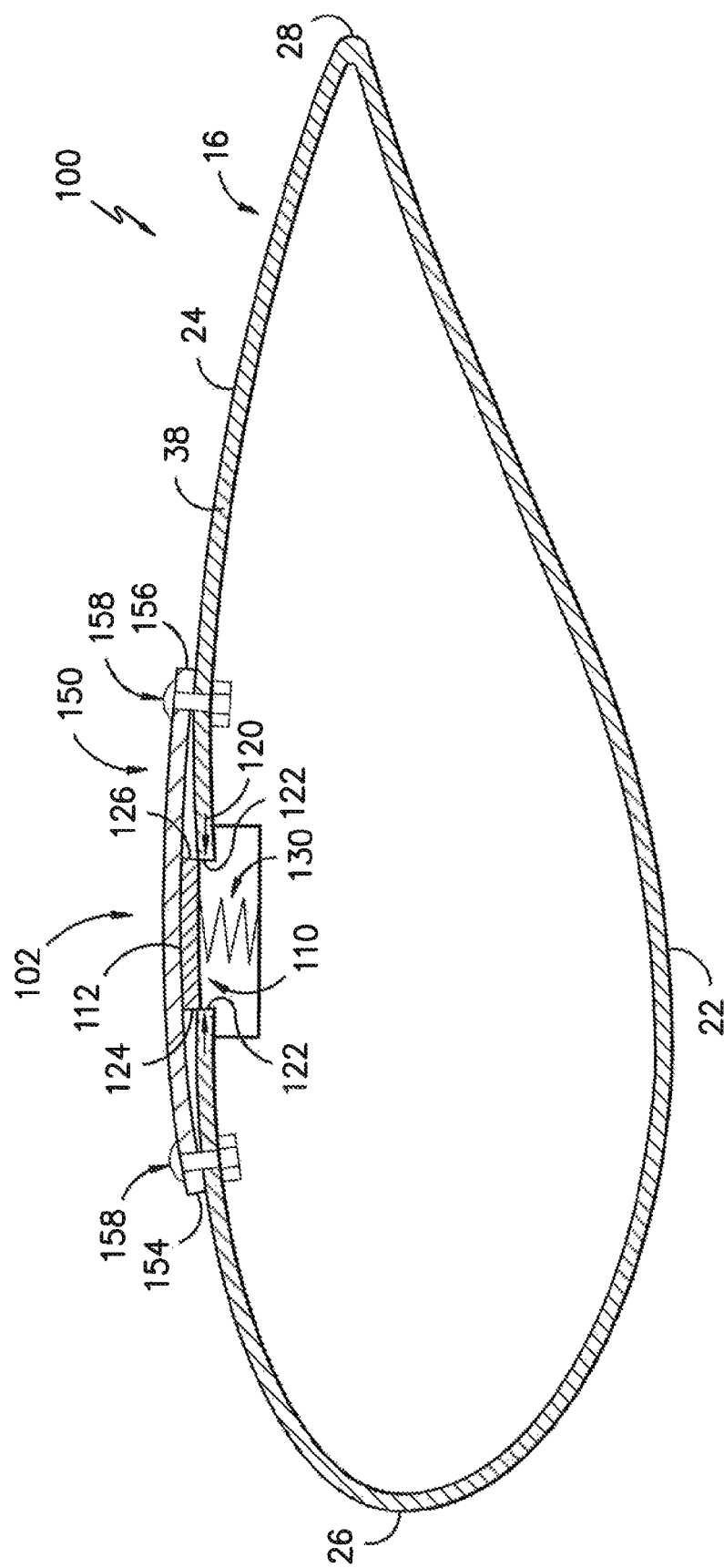
FIG. -8-

# ROTOR BLADE ASSEMBLY FOR WIND TURBINE

FIELD OF THE INVENTION

The present disclosure relates in general to rotor blade assemblies, and more particularly to rotor blade assemblies having passive spoiler assemblies for adjusting loading capabilities of rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The particular size of wind turbine rotor blades is a significant factor contributing to the overall efficiency of the wind turbine. Specifically, increases in the length or span of a rotor blade may generally lead to an overall increase in the energy production of a wind turbine. Accordingly, efforts to increase the size of rotor blades aid in the continuing growth of wind turbine technology and the adoption of wind energy as an alternative energy source. However, as rotor blade sizes increase, so do the loads transferred through the blades to other components of the wind turbine (e.g., the wind turbine hub and other components). For example, longer rotor blades result in higher loads due to the increased mass of the blades as well as the increased aerodynamic loads acting along the span of the blade. Such increased loads can be particularly problematic in high-speed wind conditions, as the loads transferred through the rotor blades may exceed the load-bearing capabilities of other wind turbine components.

Certain features, such as spoilers, are known that may be utilized to alter the flow of air from the outer surface of a rotor blade, thereby reducing the lift generated by the blade and reducing the loads acting on the blade, and thus further reducing undesirable deflection of the rotor blade. However, these features are typically designed to be permanently disposed along the outer surface of the rotor blade. As such, the amount of lift generated by the rotor blade is reduced regardless of the conditions in which the wind turbine is operating. Further, in cases where such features are movable, the features are typically active features that require controllers and actuators to deploy the features as desired. These controllers, actuators, and other components required for active features are expensive and can be easily damaged during operation of the wind turbine.

Accordingly, an improved rotor blade assembly for a wind turbine would be desired in the art. For example, a rotor blade assembly including a passive spoiler assembly would be advantageous.

BRIEF DESCRIPTION OF THE INVENTION

Aspects and advantages of the invention will be set forth in part in the following description, or may be obvious from the description, or may be learned through practice of the invention.

In one embodiment, a rotor blade assembly is disclosed. The rotor blade assembly includes a rotor blade having exterior surfaces defining a pressure side, a suction side, a leading edge, and a trailing edge extending between a tip and a root. The rotor blade further defines a span and a chord. The rotor blade includes a skin layer that includes the exterior surfaces. The rotor blade assembly further includes a passive spoiler assembly operable to alter a flow past an exterior surface of the rotor blade. The spoiler assembly includes a spoiler feature movable between a non-deployed position and a deployed position. Movement of the spoiler feature from the non-deployed position to the deployed position is caused by a change in an applied force to the spoiler feature by the skin layer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a side view of a wind turbine according to one embodiment of the present disclosure;

FIG. 2 is a top view of a rotor blade assembly according to one embodiment of the present disclosure;

FIG. 3 is a cross-sectional view, along the lines 3-3 of FIG. 2, of a rotor blade assembly including a spoiler assembly in a non-deployed position according to one embodiment of the present disclosure;

FIG. 4 is a cross-sectional view of the rotor blade assembly of FIG. 3 including a spoiler assembly in a deployed position according to one embodiment of the present disclosure;

FIG. 5 is a span-wise cross-sectional view of a rotor blade assembly including a spoiler assembly in a non-deployed position according to another embodiment of the present disclosure;

FIG. 6 is a span-wise cross-sectional view of the rotor blade assembly of FIG. 5 including a spoiler assembly in a fully deployed position according to another embodiment of the present disclosure;

FIG. 7 is a chord-wise cross-sectional view of a rotor blade assembly including a spoiler assembly in non-deployed position according to one embodiment of the present disclosure; and, FIG. 8 is a chord-wise cross-sectional view of the rotor blade assembly of FIG. 7 including a spoiler assembly in a fully deployed position according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, a rotor blade 16 according to the present disclosure may include exterior surfaces defining a pressure side 22 and a suction side 24 extending between a leading edge 26 and a trailing edge 28, and may extend from a blade tip 32 to a blade root 34. The exterior surfaces may be generally aerodynamic surfaces having generally aerodynamic contours, as is generally known in the art. Further, the rotor blade 16 may generally include a skin layer 38. The skin layer 38 is the outer layer of the rotor blade 16, and includes and defines the exterior surfaces. The skin 38 is typically formed from a fiberglass material, but it should be understood that the present disclosure is not limited to fiberglass skins, and rather that any suitable material for use as a skin layer 38 is within the scope and spirit of the present disclosure.

In some embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail building the rotor blade 16 with a curve in its static shape in a generally flapwise direction and/or in a generally edgewise direction. The flapwise direction may generally be construed as the direction (or the opposite direction) in which the aerodynamic lift acts on the rotor blade 16. The edgewise direction is generally perpendicular to the flapwise direction. Flapwise curvature of the rotor blade 16 is also known as pre-bend, while edgewise curvature is also known as sweep. Thus, a curved rotor blade 16 may be pre-bent and/or swept. Curving may enable the rotor blade 16 to better withstand flapwise and edgewise loads during operation of the wind turbine 10, and may further provide clearance for the rotor blade 16 from the tower 12 during operation of the wind turbine 10.

The rotor blade 16 may further define chord 42 and a span 44. As shown in FIG. 2, the chord 42 may vary throughout the span 44 of the rotor blade 16. Thus, a local chord may be defined for the rotor blade 16 at any point on the rotor blade 16 along the span 44.

Additionally, the rotor blade 16 may define an inboard area 52 and an outboard area 54. The inboard area 52 may be a span-wise portion of the rotor blade 16 extending from the root 34. For example, the inboard area 52 may, in some embodiments, include approximately 33%, 40%, 50%, 60%, 67%, or any percentage or range of percentages therebetween, or any other suitable percentage or range of percentages, of the span 44 from the root 34. The outboard area 54 may be a span-wise portion of the rotor blade 16 extending from the tip 32, and may in some embodiments include the remaining portion of the rotor blade 16 between the inboard area 52 and the tip 32. Additionally or alternatively, the outboard area 54 may, in some embodiments, include approximately 33%, 40%, 50%, 60%, 67%, or any percentage or range of percentages therebetween, or any other suitable percentage or range of percentages, of the span 44 from the tip 32.

As illustrated in FIGS. 2 through 8, the present disclosure may further be directed to a rotor blade assembly 100. The rotor blade assembly 100 may one or more spoiler assemblies 102 and the rotor blade 16. In general, a spoiler assembly 102 according to the present disclosure may be passively operable to alter a flow 104, such as a wind flow, past a surface or surfaces of the rotor blade 16. For example, a spoiler assembly 102 may alter flow 104 past any one or more of the pressure side 22, suction side 24, leading edge 26, or trailing edge 28. To alter flow 24, the spoiler assembly 102 may be moved from a non-deployed position to a deployed position, as discussed below. Such movement to the deployed position may separate the flow 104 from such surface or otherwise interrupt the flow 104, thus altering the flow 104 past such surface.

Alteration of the flow 104 past a surface as discussed above may adjust a loading capability of the rotor blade 16. In other words, alteration of the flow 104 may alter the lift generated by the blade 16, alter the loads acting on the blade 16, and alter the deflection of the blade 16. Typically, alteration of the flow 104 reduces the loading capability, although in some cases such alteration may increase the loading capability.

In exemplary embodiments, a spoiler assembly 102 may be disposed on and deployable from the suction side 24. Alternatively, the spoiler assembly 102 may be disposed on and deployable from the pressure side 28, or from any other suitable surface of the rotor blade 16. Further, a spoiler assembly 102 may be disposed on and deployable from the inboard area 52 or any portion thereof, the outboard area 54 or any portion thereof, or both the inboard area 52 and outboard area 54 or any portions thereof. Flow 104 may thus be altered over any of these portions of the rotor blade 16.

As mentioned, a spoiler assembly 102 according to the present disclosure operates passively. Movement of the spoiler assembly 102 between a non-deployed position and a deployed position is thus performed without the use of actuators, controllers, or other active components. Rather, interaction between the rotor blade 16 and the spoiler assembly 102 as applied forces from the rotor blade 16 to the spoiler assembly 102 change will move the spoiler assembly 102 automatically. For example, in some embodiments, when the applied force changes such that it exceeds a threshold force, the spoiler assembly will automatically move from a non-deployed position to a deployed position, as discussed below, without the use of actuators, controllers, or other active components.

As shown in FIGS. 2 through 8, a spoiler assembly 102 according to the present disclosure includes a spoiler feature 110. The spoiler feature 110 is generally movable between a non-deployed position, as shown in FIGS. 2, 3, 5, and 7, and a deployed position, as shown in FIGS. 4, 6, and 8. Movement of the spoiler feature 110 between the non-deployed position and the deployed position is caused by changes in the applied forces to the spoiler feature 110 by the rotor blade 16, such as by the skin layer 38. For example, when one or more applied forces to the spoiler feature 110 by the skin layer 38 exceed a threshold force or forces, the spoiler feature 110 may move from the non-deployed position to the deployed position. When these applied forces no longer exceed the threshold force or forces, the spoiler feature 110 may move from the deployed position to the non-deployed position.

In exemplary embodiments, the spoiler feature 110 is a membrane that replaces a portion of the skin layer 38 or is a regional modification of a portion of the skin layer 38. Thus, the skin layer 38 may in some embodiments define a cutaway portion in which the spoiler feature 110 is disposed, while in other embodiments the spoiler feature 110 may be a regional portion of the skin layer 38 that is modified to be more or less rigid that the surrounding skin layer 38. The membrane, and spoiler feature 110 in general, may be formed from any suitable material, such as from a metal or a polymer material. In exemplary embodiments, the spoiler feature 110 is formed from fiberglass. In further exemplary embodiments, the spoiler feature 110 is formed from a material that is less flexible than the material that the skin layer 38 is formed from. Further, the spoiler feature 110 may generally have any suitable shape and/or configuration that provides for alteration of the flow 104 past an exterior surface of the rotor blade 16 when fully or partially deployed. For example, a spoiler feature 110 may be a generally rectangular plate which may have an aerodynamic curvature, as shown, or may be a generally cube-like structure, or have a triangular shape, a curved shape (e.g., a semi-elliptical or semi-circular shape), an "L" shape, or any other suitable shape.

In exemplary embodiments as shown, an exterior surface 112 of the spoiler feature 110 is generally flush with the exterior surfaces of the rotor blade 16, such as with the neighboring exterior surfaces, when the spoiler feature 110 is in the non-deployed position. In these embodiments, a generally continuous exterior surface is defined, and a generally smooth transition provided, between the exterior surface of the rotor blade 16 and the exterior surface 112 of the spoiler feature 110. In other embodiments, the exterior surface 112 of the spoiler feature 110 is not flush with the exterior surfaces of the rotor blade 16 when the spoiler feature 110 is in the non-deployed position. For example, the exterior surface 112 may be above or below the level of the neighboring exterior surfaces, such that a generally discontinuous exterior surface is defined.

As shown in FIGS. 2 through 8, a spoiler feature 110 extends between a first end 114 and a second end 116. The spoiler feature 110 may in some embodiments as shown in FIGS. 2 through 4 extend in a generally chord-wise direction between the first end 114 and the second end 116. In other embodiments as shown in FIGS. 5 through 8, the spoiler feature 110 may extend in the generally span-wise direction between the first end 114 and the second end 116. In still further embodiments, the spoiler feature 110 may extend between the first end 114 and the second end 116 in any suitable direction, such as at any suitable angle to the span-wise or chord-wise direction.

Further, in some embodiments one or both of the first end 114 and second end 116 of the spoiler feature 110 may be coupled to the skin layer 38. For example, as shown in FIGS. 5 and 6, the first end 114 may be coupled to the skin layer 38 by a hinge 118. The hinge 118 may allow the spoiler feature 110 to pivot about the hinge 118 and first end 114 when moving between the non-deployed and deployed positions. In other embodiments, the second end 114 may be similarly coupled to the skin layer 38. Still further, any suitable coupling apparatus, including but not limited to a mechanical fastener such as a nut-bolt combination, nail, screw, or rivet, may be utilized to couple the first end 114 and/or the second end 116 to the skin layer 38. The spoiler feature 110 in some embodiments may be allowed to pivot about this coupled first end 114 and/or second end 116, or may be otherwise retained with respect to the skin layer 38.

It should be noted that in some embodiments, the first end 114 and/or second end 116 may be not coupled to and free from the skin layer 38, as shown for example, in FIGS. 3, 4, 7 and 8, as well as by the second end 116 in FIGS. 5 and 6. In these embodiments, the first end 114 and/or second end 116 may move freely with respect to the skin layer 38.

As mentioned, movement of the spoiler feature 110 from a non-deployed position, as shown in FIGS. 2, 3, 5, and 7, to a deployed position, as shown in FIGS. 4, 6, and 8, is caused by a change in an applied force or forces to the spoiler feature 110 by the skin layer 38. For example, the spoiler feature 110 may deploy when the applied forces on the spoiler feature 110 exceed a threshold force. In exemplary embodiments, as shown, the applied forces are compressive forces. For example during operation of the wind turbine 10, the rotor blade 16 may bend, twist, flex, or otherwise move such that a change in stress concentrations in the rotor blade 16 is incurred. As shown in FIGS. 3 through 8, such movement of the rotor blade 16 may cause movement of the skin layer 38. This movement may in turn cause the applied forces from the skin layer 38 on the spoiler feature 110, shown by arrows and labeled as reference numeral 120, to change. For example, in the embodiments shown, movement of the rotor blade 16 may cause the portion of the skin layer 38 defining the pressure side 22 to be in tension, while the portion of the skin layer 38 defining the suction side 24 is in compression. Thus, the applied forces 120 on the spoiler feature 110 from the skin layer 38 may change from tensile forces to compressive forces, and the compressive forces may increase, due to such movement of the rotor blade 16. This change in the applied forces 120, such that the applied forces 120 become compressive and the compressive forces increase, may cause deployment of the spoiler feature 110 from a non-deployed position to a deployed position.

As shown in FIGS. 3 through 8, for example, the skin layer 38 may define a cutaway edge 122. The cutaway edge 122 may define the cutaway portion of the skin layer 38 wherein spoiler feature 110 is disposed. Thus, the cutaway edge 122 may be in contact with, and interact with, a peripheral edge of the spoiler feature 110. The peripheral edge may, for example, include the first end 114 and second end 116 of the spoiler feature 110 as well as opposing first side 124 and second side 126 of the spoiler feature 110, or may have any other suitable shape.

As further shown, the cutaway edge 122 or various portions thereof may be beveled. Further, the peripheral edge of the spoiler feature 110 or various portions thereof may be beveled in a similar mating fashion as shown. For example, the first side 124 and/or second side 126 may be beveled as shown in FIGS. 3 through 8. The mating bevels of the cutaway edge 122 and peripheral edge may cause the spoiler feature 110 to move from a non-deployed position to a deployed position due to changes in the applied forces 120 from the skin layer 38 to the spoiler feature 110, as shown. For example, compression of the skin layer 38 as discussed above may cause compressive forces from the skin layer 38 to be applied to the spoiler feature, such as through the first side 124 and second side 126 as shown. Changes in the applied forces to these compressive forces, and increases therein, may cause deployment of the spoiler feature, as shown.

It should be understood that the applied forces of the present disclosure are not limited to compressive forces. For example, in other embodiments, the applied forces may be tensile forces or any other suitable forces. Changes in applied forces to these applied forces, and increases or decreases therof, may cause movement of the spoiler feature 110 from a non-deployed position to a deployed position. Reversal of these applied forces may cause movement of the spoiler feature 110 from a deployed position to a non-deployed position.

As discussed, in some embodiments, movement of the spoiler feature 110 from the non-deployed position to the deployed position may occur when a change in an applied force or forces exceeds a threshold force. The threshold force may be a force or range of forces wherein deployment of the spoiler feature 110 is triggered, such that the spoiler feature 110 begins to move from the non-deployed position to the deployed position. Various variables, such as the size, shape and material of the spoiler feature 110 or the angle of the bevels, may be adjusted such that the threshold force is a particular desired or required force or range of forces.

In some embodiments, for example, the spoiler feature 110 may be designed to deploy when the rotor blade 16, during operation, bends towards the tower 12. To avoid contact with the tower 12, the spoiler feature 110 may be designed to deploy once the rotor blade 16 has bent towards the tower 12 a sufficient amount before contact with the tower 12 such that a threshold force is reached. Once this threshold force is reached, the spoiler feature 110 may deploy, and alter flow 104 over the rotor blade 16. Alteration of the flow 104 over the rotor blade 16 may reduce loading of the rotor blade 16, thus reducing bending of the rotor blade 16 such that no contact with the tower 12 occurs. It should be understood that deployment of the rotor blade 16 occurs passively, such that no active deployment of the spoiler assembly 102 is required.

In some embodiments, as shown in FIGS. 3, 4, 7 and 8, a spoiler assembly 102 according to the present disclosure further includes one or more biasing elements 130. A biasing element 130 according to the present disclosure provides a biasing force to the spoiler feature. A biasing element 130 may be, for example, a spring as shown, or any other suitable component that can bias a connected element in one direction or another. The biasing element 130 as shown may be connected to the spoiler feature 110. The biasing element 130 may be configured to, and may, bias the spoiler feature 110 towards a non-deployed position or a deployed position. In exemplary embodiments, as shown, the biasing element 130 biases the spoiler feature 110 towards the non-deployed position. Thus, when in the deployed position, the biasing element 130 may pull (as shown) or push or otherwise force the spoiler feature 110 towards the non-deployed position. Further, the biasing force of the biasing element 130 can be calibrated such that the spoiler feature 110 deploys when a threshold force is exceeded, and such that the spoiler feature 110 moves back to the non-deployed position when the threshold force is no longer exceeded.

In some embodiments, as shown in FIGS. 5 and 6, a hole or pocket 140 may be defined in the skin layer 38, such as from an exterior surface of the rotor blade 16. The hole or pocket 140 may be positioned to accommodate a portion of the spoiler feature 110, such as a first end 114, second end 116, first side 124, or second side 126, therein when the spoiler feature 110 is in the deployed position. As shown in FIG. 6, for example, the skin 38 may bend or otherwise move to cause the spoiler feature 110 to be deployed. Such movement may position the hole or pocket 140 such that a portion of the spoiler feature 110, when the spoiler feature 110 is deployed, may fit into and thus be accommodated within the hole or pocket 140.

In some embodiments, as shown in FIGS. 2 though 4, 7 and 8, a spoiler assembly 102 according to the present disclosure may include a secondary spoiler feature 150. The secondary spoiler feature 150 extends along one or more exterior surfaces or portions thereof of the rotor blade 16, and further extends across the spoiler feature 110. Movement of the spoiler feature 110 from a non-deployed position to a deployed position may cause movement of the secondary spoiler feature 150 from a non-deployed position to a deployed position.

In exemplary embodiments, the secondary spoiler feature 150 is a membrane. The membrane, and secondary spoiler feature 150 in general, may be formed from any suitable material, such as from a metal or a polymer material. In exemplary embodiments, the secondary spoiler feature 150 is formed from fiberglass. In further exemplary embodiments, the secondary spoiler feature 150 is formed from a material that is less flexible than the material that the skin layer 38 is formed from. Further, the secondary spoiler feature 150 may generally have any suitable shape and/or configuration that provides for alteration of the flow 104 past an exterior surface of the rotor blade 16 when fully or partially deployed. For example, a secondary spoiler feature 150 may be a generally rectangular plate which may have an aerodynamic curvature, as shown, or may be a generally cube-like structure, or have a triangular shape, a curved shape (e.g., a semi-elliptical or semi-circular shape), an "L" shape, or any other suitable shape.

As shown in FIGS. 2 through 8, a secondary spoiler feature 150 extends between a first end 154 and a second end 156. The secondary spoiler feature 150 may in some embodiments as shown in FIGS. 2 through 4 extend in a generally span-wise direction between the first end 154 and the second end 156. In other embodiments as shown in FIGS. 7 and 8, the secondary spoiler feature 150 may extend in the generally chord-wise direction between the first end 154 and the second end 156. In still further embodiments, the secondary spoiler feature 150 may extend between the first end 154 and the second end 156 in any suitable direction, such as at any suitable angle to the span-wise or chord-wise direction. In some embodiments, the secondary spoiler feature 150 may extend generally perpendicular to the spoiler feature 110, while in other embodiments the secondary spoiler feature 150 may extend at any suitable angle with respect to the spoiler feature 110.

Further, in some embodiments one or both of the first end 154 and second end 156 of the secondary spoiler feature 150 may be coupled to the skin layer 38. For example, as shown in FIGS. 3, 4, 7 and 8, the first end 154 and second end 156 may be coupled to the skin layer 38 by a mechanical fastener 158, such as a nut-bolt combination, nail, screw, rivet, or other suitable mechanical fastening component, or by a hinge or other suitable coupling apparatus. In other embodiments, neither of the first end 154 or second end 156 may be coupled to the skin layer 38. For example, the secondary spoiler feature 150 in general may be coupled to the spoiler feature 110. In some embodiments, the secondary spoiler feature 150 may not be coupled to the skin layer 38, so that deployment of the spoiler feature 110 moves the entire secondary spoiler feature 150.

As mentioned, movement of the secondary spoiler feature 150 from a non-deployed position, as shown in FIGS. 2, 3 and 7, to a deployed position, as shown in FIGS. 4 and 8, is caused by deployment of the spoiler feature 110. For example, the secondary spoiler feature 150 may extend across the spoiler feature 110. The spoiler feature 110 when deployed may contact the secondary spoiler feature 150. The secondary spoiler feature 150 may thus be moved from a non-deployed position to a deployed position through contact with and movement of the spoiler feature 110.

The secondary spoiler feature 150 may extend between the first end 154 and second end 156 through the inboard area 52 or any portion thereof and/or the outboard area 54 or any portion thereof. Use of a secondary spoiler feature 150 as shown may allow for flow 104 over a larger area of the rotor blade 16 to be altered than that area through which the spoiler feature 110 extends.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly, comprising:
    a rotor blade having exterior surfaces defining a pressure side, a suction side, a leading edge, and a trailing edge extending between a tip and a root, the rotor blade further defining a span and a chord, the rotor blade comprising a skin layer that includes the exterior surfaces; and,
    a passive spoiler assembly operable to alter a flow past an exterior surface of the rotor blade, the spoiler assembly comprising a spoiler feature movable between a non-deployed position and a deployed position and a biasing element providing a biasing force to the spoiler feature,
    wherein movement of the spoiler feature from the non-deployed position to the deployed position is caused by a change in an applied force to the spoiler feature by the skin layer.

2. The rotor blade assembly of claim 1, wherein the applied force is a compressive force.

3. The rotor blade assembly of claim 1, wherein an exterior surface of the spoiler feature in the non-deployed position is generally flush with the exterior surfaces of the rotor blade.

4. The rotor blade assembly of claim 1, wherein a first end of the spoiler feature is coupled to the skin layer.

5. The rotor blade assembly of claim 1, wherein the biasing element biases the spoiler feature towards the non-deployed position.

6. The rotor blade assembly of claim 1, wherein the spoiler assembly further comprises a secondary spoiler feature extending along a portion of an exterior surface of the rotor blade and across the spoiler feature, and wherein movement of the spoiler feature from the non-deployed position to the deployed position causes movement of the secondary spoiler feature from as non-deployed position to a deployed position.

7. The rotor blade assembly of claim 6, wherein the secondary spoiler feature extends in a generally span-wise direction.

8. The rotor blade assembly of claim 6, wherein a first end of the secondary spoiler feature is coupled to the skin layer.

9. The rotor blade assembly of claim 1, wherein the spoiler assembly is disposed on the suction side of the rotor blade.

10. A wind turbine, comprising:
    a plurality of rotor blades each having exterior surfaces defining a pressure side, a suction side, a leading edge, and a trailing edge extending between a tip and a root, each of the plurality of rotor blades further defining a span and a chord, each of the plurality of rotor blades further comprising a skin layer that includes the exterior surfaces of that rotor blade; and,
    a passive spoiler assembly operable to alter a flow past an exterior surface of one of the plurality of rotor blades, the spoiler assembly comprising a spoiler feature movable between a non-deployed position and a deployed position and a biasing element providing a biasing force to the spoiler feature,
    wherein movement of the spoiler feature from the non-deployed position to the deployed position is caused by a change in an applied force to the spoiler feature by the skin layer.

11. The wind turbine of claim 10, wherein the applied force is a compressive force.

12. The wind turbine of claim 10, wherein an exterior surface of the spoiler feature in the non-deployed position is generally flush with the exterior surfaces of the rotor blade.

13. The wind turbine of claim 10, wherein a first end of the spoiler feature is coupled to the skin layer.

14. The wind turbine of claim 10, wherein the biasing element biases the spoiler feature towards the non-deployed position.

15. The wind turbine of claim 10, wherein the spoiler assembly further comprises a secondary spoiler feature extending along a portion of an exterior surf ace of the rotor blade and across the spoiler feature, and wherein movement of the spoiler feature from the non-deployed position to the deployed position causes movement of the secondary spoiler feature from a non-deployed position to a deployed position.

16. The wind turbine of claim 15, wherein the secondary spoiler feature extends in a generally span-wise direction.

17. The wind turbine of claim 15, wherein a first end of the secondary spoiler feature is coupled to the skin layer.

18. The wind turbine of claim 10, wherein the spoiler assembly is disposed on the suction side of the rotor blade.

19. A rotor blade assembly, comprising;
    a rotor blade having exterior surfaces defining a pressure side, a suction side, a leading edge, and a trailing edge extending between a tip and a root, the rotor blade further defining a span and a chord, the rotor blade comprising a skin layer that includes the exterior surfaces; and,
    a passive spoiler assembly operable to alter a flow past an exterior surface of the rotor blade, the spoiler assembly comprising a spoiler feature movable between a non-deployed position and a deployed position and a secondary spoiler feature extending along a portion of an exterior surface of the rotor blade and across the spoiler feature,
    wherein movement of the spoiler feature from the non-deployed position to the deployed position is caused by a change in an applied force to the spoiler feature by the skin layer, and wherein movement of the spoiler feature from the non-deployed position to the deployed position causes movement of the secondary spoiler feature from a non-deployed position to a deployed position.

20. The rotor blade assembly of claim 19, wherein the applied force is a compressive force.

* * * * *